US011416885B1

(12) United States Patent
Bube et al.

(10) Patent No.: US 11,416,885 B1
(45) Date of Patent: Aug. 16, 2022

(54) DIGITAL PROMOTION PROCESSING SYSTEM FOR GENERATING A DIGITAL PROMOTION BASED UPON DURABLE GOOD PRODUCT REPLACEMENT DATES AND RELATED METHODS

(71) Applicant: Inmar Clearing, Inc., Winston-Salem, NC (US)

(72) Inventors: Melissa Bube, High Point, NC (US); Jacob Bowman, High Point, NC (US); Joel Corra, Winston-Salem, NC (US); Jason Eudy, Pinnacle, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 17/130,662

(22) Filed: Dec. 22, 2020

(51) Int. Cl.
*G06Q 30/02* (2012.01)
*G06Q 30/06* (2012.01)
*G06N 20/00* (2019.01)

(52) U.S. Cl.
CPC ......... *G06Q 30/0224* (2013.01); *G06N 20/00* (2019.01); *G06Q 30/0625* (2013.01); *G06Q 30/0631* (2013.01)

(58) Field of Classification Search
CPC ........... G06Q 30/0224; G06Q 30/0631; G06Q 30/0625; G06N 20/00
See application file for complete search history.

(56) References Cited

U.S. PATENT DOCUMENTS

| 7,827,058 B2 | 11/2010 | Mortimer | |
|---|---|---|---|
| 7,885,726 B2 | 2/2011 | Walker et al. | |
| 8,380,579 B2 | 2/2013 | Flinn et al. | |
| 2009/0130636 A1* | 5/2009 | Hwang | A46B 15/0008 433/216 |
| 2017/0103677 A1* | 4/2017 | Bhattacharjee | G16H 20/70 |
| 2019/0272557 A1* | 9/2019 | Smith | G06Q 30/0224 |
| 2019/0385213 A1* | 12/2019 | Pande | G06Q 30/0631 |

OTHER PUBLICATIONS

Barry L. Bayus, The Targeted Marketing of Consumer Durables, Journal of Direct Marketing, vol. 7 No. 4 (Year: 1993).*

* cited by examiner

*Primary Examiner* — E Carvalho
(74) *Attorney, Agent, or Firm* — Allen, Dyer, Doppelt + Gilchrist, P.A.

(57) ABSTRACT

A digital promotion processing system may include user devices each associated with a respective different user and a promotion processing server. The promotion processing server may be configured to store historical purchase data for durable good products purchased by the users. The historical purchase data may include a replacement lifespan and a purchase date. The promotion processing server may also be configured to determine an expected product replacement date for a given durable good product from among the durable good products based upon an elapsed time from the purchase date relative to the replacement lifespan, and upon reaching the expected product replacement date, generate and communicate a digital promotion for a replacement durable good product to a corresponding one of the user devices.

15 Claims, 10 Drawing Sheets

DIGITAL PROMOTION PROCESSING SYSTEM FOR GENERATING A DIGITAL PROMOTION BASED UPON DURABLE GOOD PRODUCT REPLACEMENT DATES AND RELATED METHODS

TECHNICAL FIELD

The present application relates to the field of electronics, and, more particularly, to digital promotion systems, and related methods.

BACKGROUND

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

A durable good may be considered a good that does not quickly wear out, or more specifically, one that yields utility over time rather than being completely consumed in one use. Exemplary durable goods may include refrigerators, freezers, washing machines, building products, and vehicles, such as, cars, boats, etc., since these goods or products generally continue to be useful for three or more years.

In contrast to a durable good, a non-durable good may be considered a consumable good. A non-durable good may be consumed immediately or within a relatively short amount of time from a purchase date. Exemplary non-durable goods may include food, fuel, medication, and cleaning products.

SUMMARY

A digital promotion processing system may include a plurality of user devices each associated with a respective different user. The digital promotion processing system may also include a promotion processing server configured to store historical purchase data for each of a plurality of durable good products purchased by the plurality of users. The historical purchase data may include a replacement lifespan and a purchase date. The promotion processing server may be configured to determine an expected product replacement date for a given durable good product from among the plurality thereof based upon an elapsed time from the purchase date relative to the replacement lifespan, and upon reaching the expected product replacement date, generate and communicate a digital promotion for a replacement durable good product to a corresponding one of the plurality of user devices.

The promotion processing server may be configured to obtain respective durable good product return data for each of the plurality of durable good products and apply machine learning to update the expected product replacement dates based upon the respective durable good product return data, for example. The durable good product return data may include an elapsed time from the purchase date to a corresponding return date.

The promotion processing server may be configured to determine a remaining time from the corresponding return date relative to the corresponding replacement lifespan. The durable good product return data may include a reason for return for each of the plurality of durable good products, for example.

The promotion processing server may be configured to store historical purchase data for each of a plurality of non-durable good products purchased by the plurality of users, associate ones of the non-durable good products with corresponding ones of the plurality of durable good products based upon expected usage, and apply machine learning to update the expected product replacement date based upon the associated ones of the non-durable good products. The promotion processing server is configured to update the expected product replacement date based upon a frequency of purchase of the associated non-durable good products for each corresponding durable good product, for example.

The digital promotion may be redeemable toward a non-durable good product used with the given durable good product. The given durable good product may have a product category associated therewith, and wherein the digital promotion may be redeemable toward another product of a same product category, for example.

The given durable good product may have a durable good product brand associated therewith. The digital promotion may be redeemable toward another durable good product of a different durable good product brand, for example.

A method aspect is directed to a method of processing a digital promotion. The method may include using a promotion processing server to store historical purchase data for each of a plurality of durable good products purchased by a plurality of users. The historical purchase data may include a replacement lifespan and a purchase date. The method may also include using the promotion processing server to determine an expected product replacement date for a given durable good product from among the plurality thereof based upon an elapsed time from the purchase date relative to the replacement lifespan, and upon reaching the expected product replacement date, generate and communicate the digital promotion for a replacement durable good product to a corresponding one of a plurality of user devices each associated with a respective different user from among the plurality thereof.

A computer readable medium aspect is directed to a non-transitory computer readable medium for processing a digital promotion. The non-transitory computer readable medium includes computer executable instructions that when executed by a processor cause the processor to perform operations. The operations may include storing in a memory associated with the processor historical purchase data for each of a plurality of durable good products purchased by a plurality of users. The historical purchase data may include a replacement lifespan and a purchase date. The operations may also include determining an expected product replacement date for a given durable good product from among the plurality thereof based upon an elapsed time from the purchase date relative to the replacement lifespan, and upon reaching the expected product replacement date, generating and communicating the digital promotion for a replacement durable good product to a corresponding one of a plurality of user devices each associated with a respective different user from among the plurality thereof.

BRIEF DESCRIPTION OF THE DRAWINGS

FIG. 9b is another schematic diagram of a portion of a digital promotion processing system in accordance with the embodiment of FIG. 9a.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternative embodiments.

Figure 1:
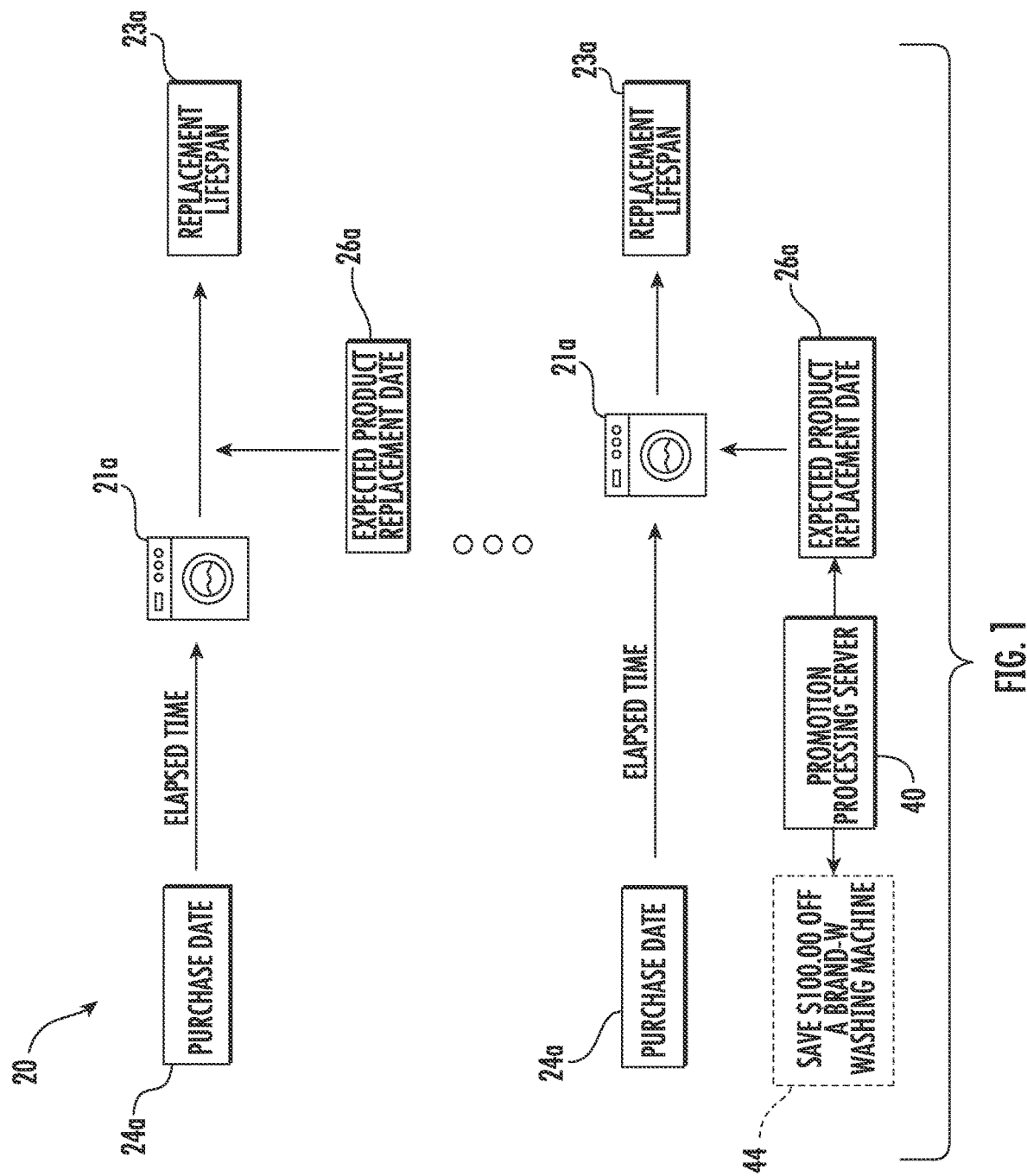
FIG. 1 is a schematic diagram of a digital promotion processing system in accordance with an embodiment.
Figure 2:
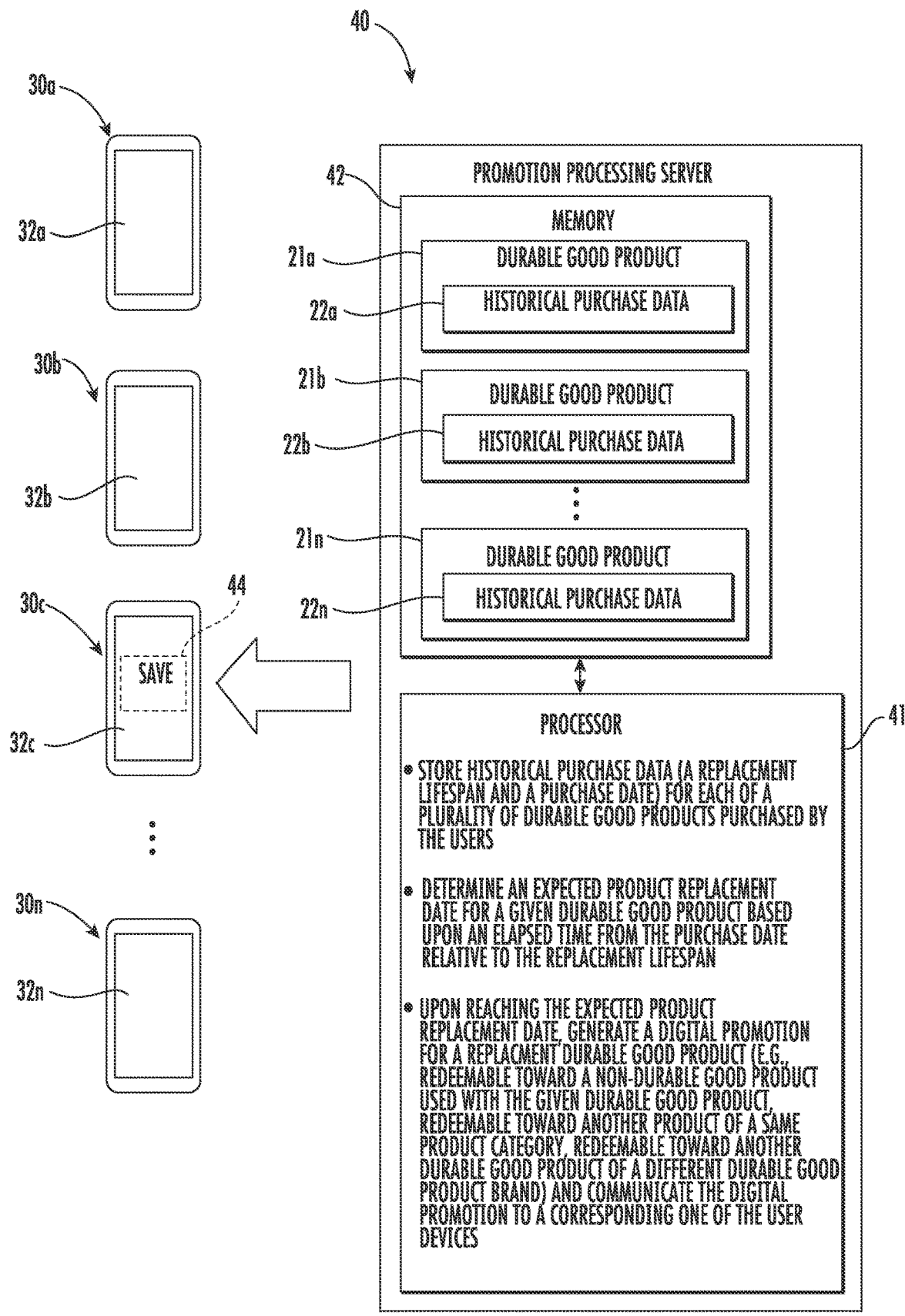
FIG. 2 is a schematic block diagram of a portion of the digital promotion processing system of FIG. 1.
Figure 3:
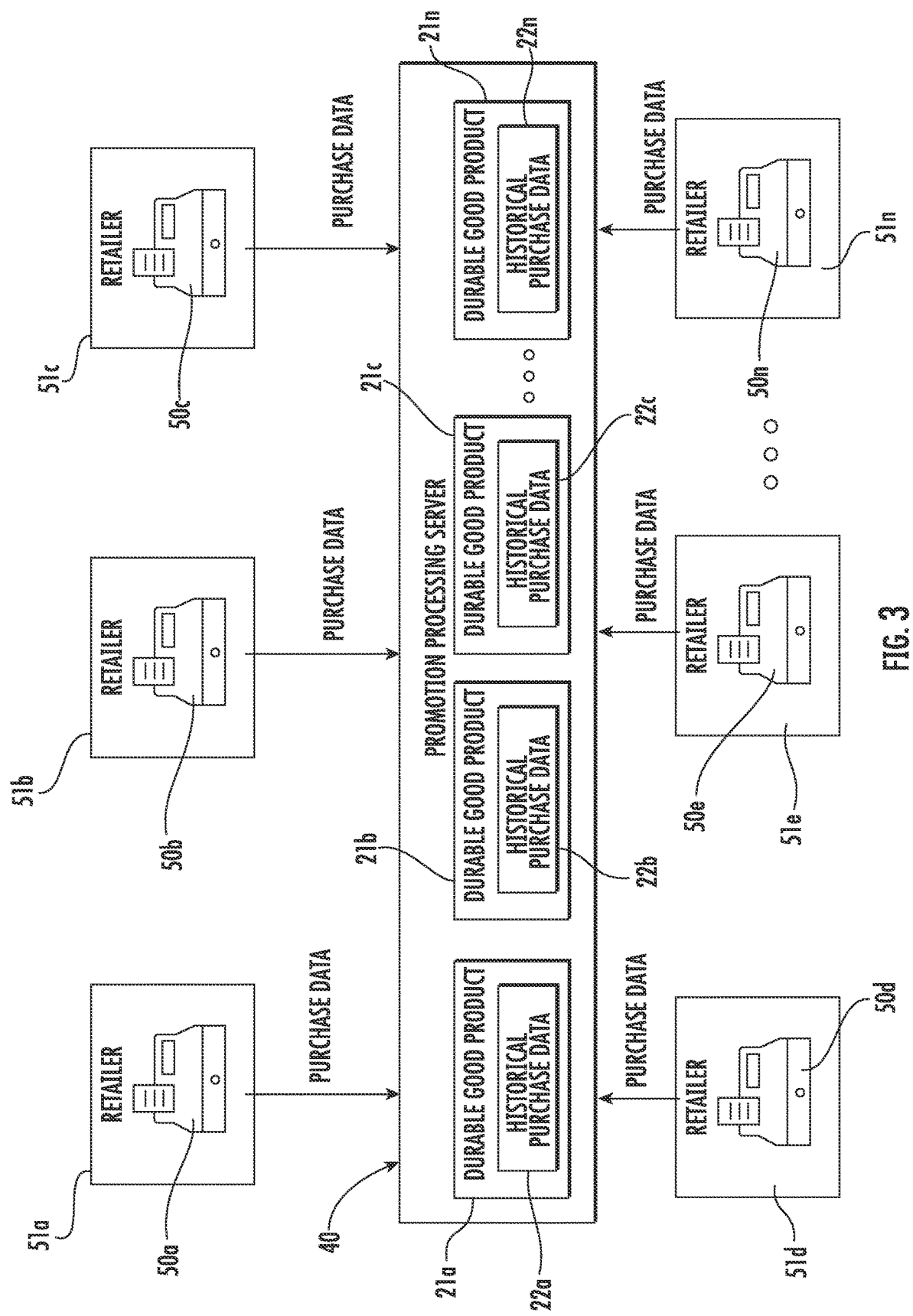
FIG. 3 is a schematic block diagram of a portion of the digital promotion processing system of FIG. 1.

Referring initially to FIGS. 1-3, a digital promotion processing system 20 includes user devices 30a-30n. Each user device 30a-30n is associated with a respective different user. An exemplary user device 30a-30n may be in the form of a mobile wireless communications device, for example, a mobile phone and include a display 32a-32n. Each user device 30a-30n may be in the form of different type of device, for example, a laptop, tablet, or wearable device.

The digital promotion processing system 20 also includes a promotion processing server 40. The promotion processing server includes a processor 41 and an associated memory 42. While operations of the promotion processing server 40 are described herein, those skilled in the art will appreciate that the operations are performed through cooperation of the processor 31 and the memory 32.

Figure 4:
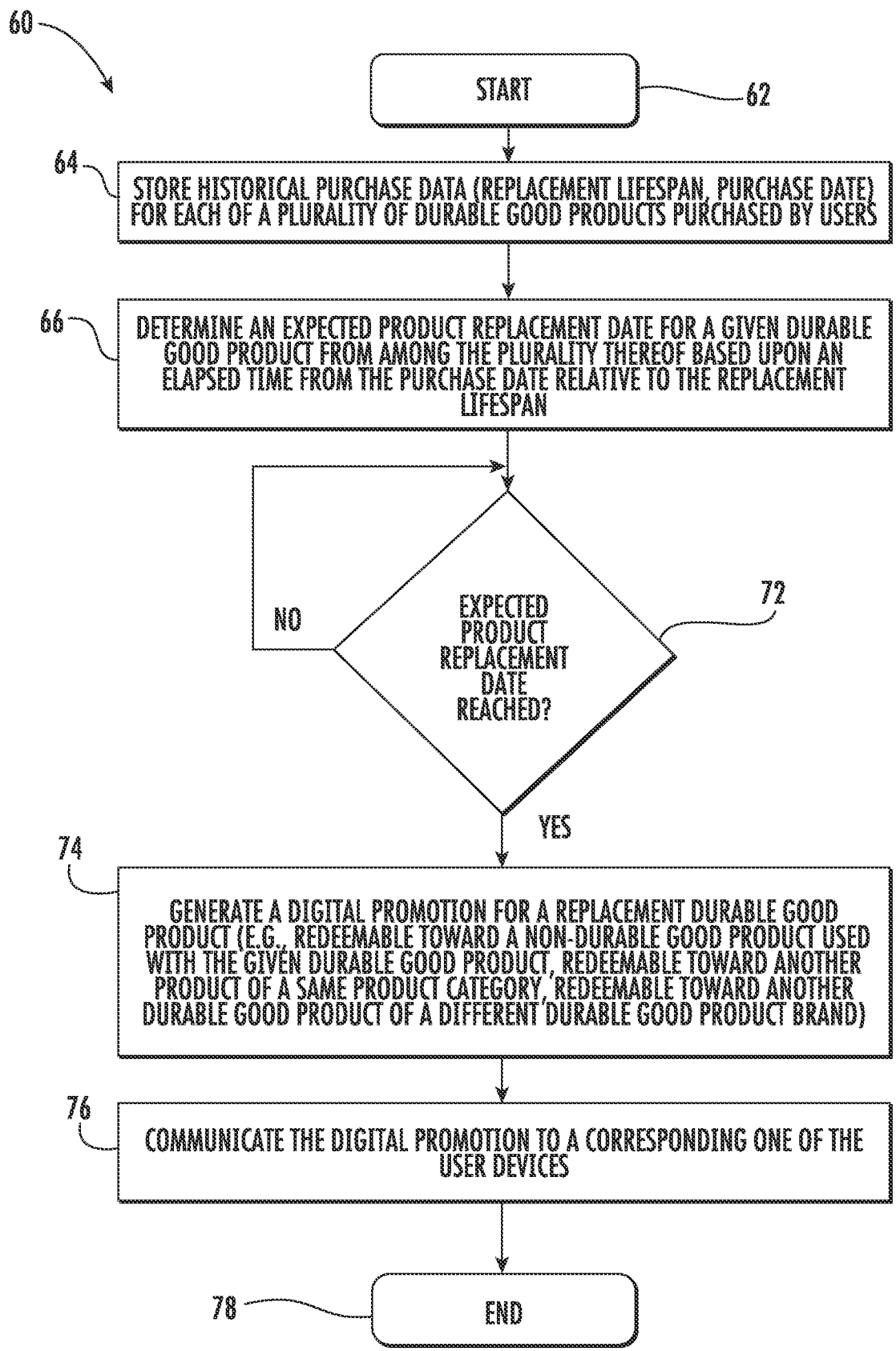
FIG. 4 is a flow chart illustrating operation of the promotion processing server in accordance with an embodiment.

Referring now to the flowchart 60 in FIG. 4, beginning at Block 62, operations of the promotion processing server will now be described. At Block 64, historical purchase data 22a-22n for durable good products 21a-21n purchased by the users are stored, for example, in the memory 42. By durable good products, those skilled in the art will appreciate that a durable good is a good or product that does not quickly wear out, or more specifically, one that yields utility over time rather than being completely consumed in one use. Exemplary durable good products may include refrigerators, freezers, washing machines, building products, and vehicles, such as, cars, boats, etc., since these goods or products generally continue to be useful for three or more years.

The historical purchase data 22a-22n includes a replacement lifespan 23a for each durable good product and a purchase date 24a. The replacement lifespan 23a may be considered a product lifespan, the time period the durable good product is operational for its desired function until the durable good product is discarded, for example, based upon mechanical failure or failure of the durable good product to operate effectively for it intended purpose. The replacement lifespan 23a may be considered a service life, that is, a measure of the effective time a product is used by the user. In some embodiments, the replacement lifespan 23a may considered or based upon a replacement life or a period after which the initial user or purchaser returns to the store or retailer for a replacement durable good product. The replacement lifespan 23a may be obtained from a manufacturer, for example, or other source, and stored in the memory 42.

The historical purchase data 22a-22n may be updated over time. For example, the promotion processing server 40 may cooperate with point-of-sale (POS) terminals 50a-50n at different retailers 51a-51n or stores to obtain purchase data, for example, individual purchase data, which may include a product identifier (e.g., uniform product code (UPC), a stock keeping unit (SKU), etc.), a corresponding product cost, and a user identifier, for example, a loyalty account username or other identifier (FIG. 3).

The promotion processing server 40 may correlate different user identifiers for the same user across retailers, for example, to build the historical purchase data 22a-22n. The promotion processing server 40 may obtain individual purchase data for a given user at the completion of the purchase transaction at the POS terminal 50a-50n of the corresponding retailer 51a-51n. This way, the promotion processing server 40 maintains relatively accurate historical purchase data 22a-22n for users and across different retailers for the durable good products 21a-21n.

The promotion processing server 40, at Block 66, determines an expected product replacement date 26a for a given durable good product 21a from among the durable good products 21a-21n. The expected product replacement date 26a for the given durable good product 21a is determined based upon an elapsed time from the purchase date 24a relative to the replacement lifespan 23a. For example, if a given durable good product 21a, such as, for example, a washing machine, has a replacement lifespan 23a of ten years, the expected product replacement date 26a may be determined to be any time after year seven (FIG. 1). In other words, the expected product replacement date 26a may be the replacement lifespan 23a for the given user, individually, or the users as a whole, or the period after which the user returns to the store or retailer for a replacement durable good product, which may be irrespective whether the durable good product is still operational.

At Block 72, the promotion processing server 40 determines whether the expected product replacement date 26a has been reached, and when so, the promotion processing server 40 generates a digital promotion 44 for a replacement durable good product (Block 74) (FIG. 1). At Block 76, the promotion processing server 40 communicates the digital promotion 44 for the replacement durable good product to the corresponding user device 30c, for example, for display on the display 32c (FIG. 2). When the expected product replacement date 26a has not been reached, operations continue, for example, by polling or waiting for the expected product replacement date to be reached (Block 72).

The digital promotion 44 may be redeemable toward another durable good product. More particularly, the given durable good product 21a may have a brand associated therewith, for example, "Brand-W", and the digital promotion 44 may be applicable toward the purchase of another "Brand-W" product. The another "Brand-W" product may be the same item or newer model of the same item (e.g., a washing machine). Of course, the digital promotion 44 may be redeemable toward a different product of the same brand (e.g., a "Brand-W" dryer).

In some embodiments, the digital promotion 44 may be redeemable toward the purchase of a durable good product of the same category (e.g., washing machine, dryer, or refrigerator), which may not necessarily be the same brand as the given durable good product. In some embodiments, the digital promotion 44 may be redeemable toward the purchase of a product of a different brand as the given durable good product, for example, a competitor product. The digital promotion 44 being applicable to a competitor durable good product may be particularly advantageous when the expected product replacement date 26a for the given durable good product 21a is relatively far from its corresponding replacement lifespan (e.g., less the half).

The digital promotion 44 may be in the form of a digital coupon, for example. The digital promotion 44 may, alternatively, be in the form of a digital rebate. Operations end at Block 78.

Figure 5:
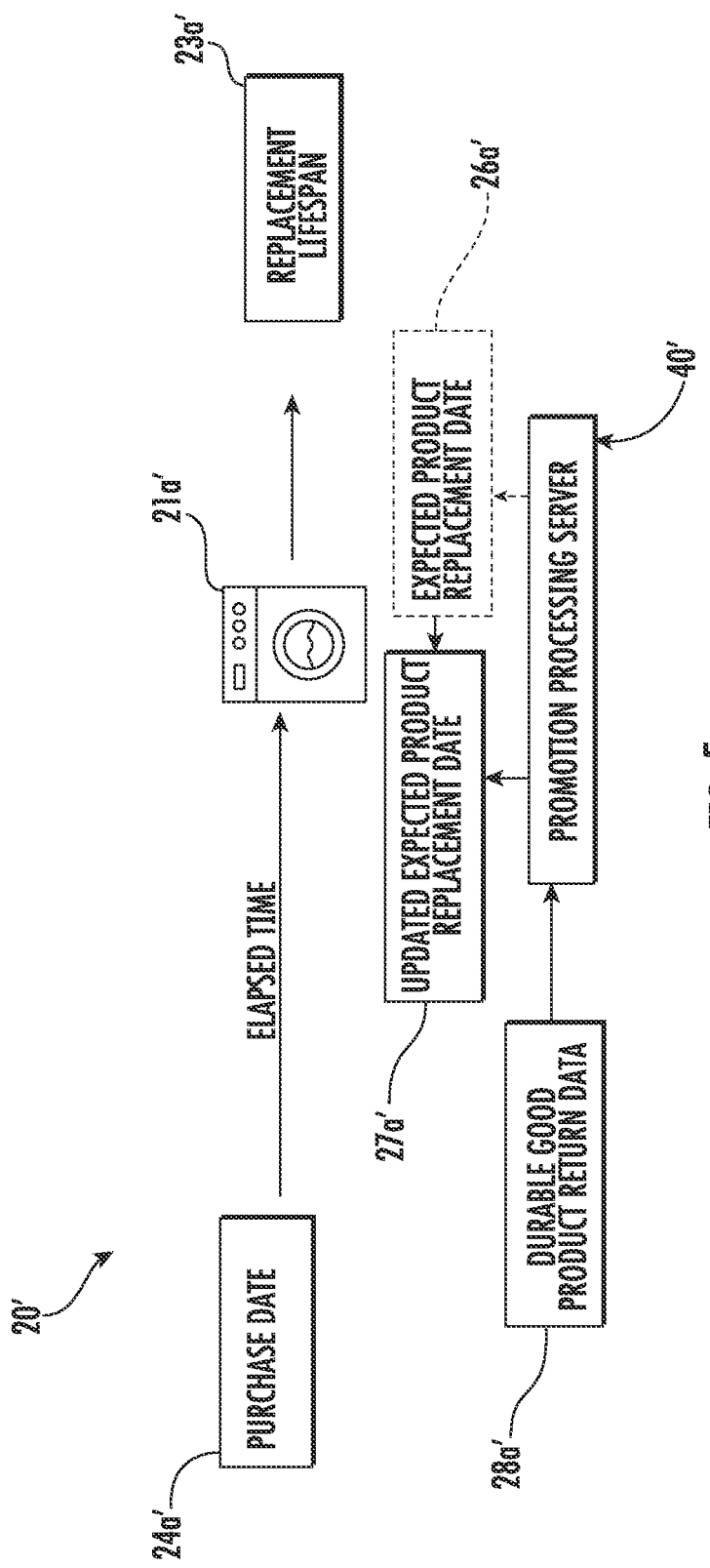
FIG. 5 is a schematic diagram of a digital promotion processing system in accordance with an embodiment.
Figure 6:
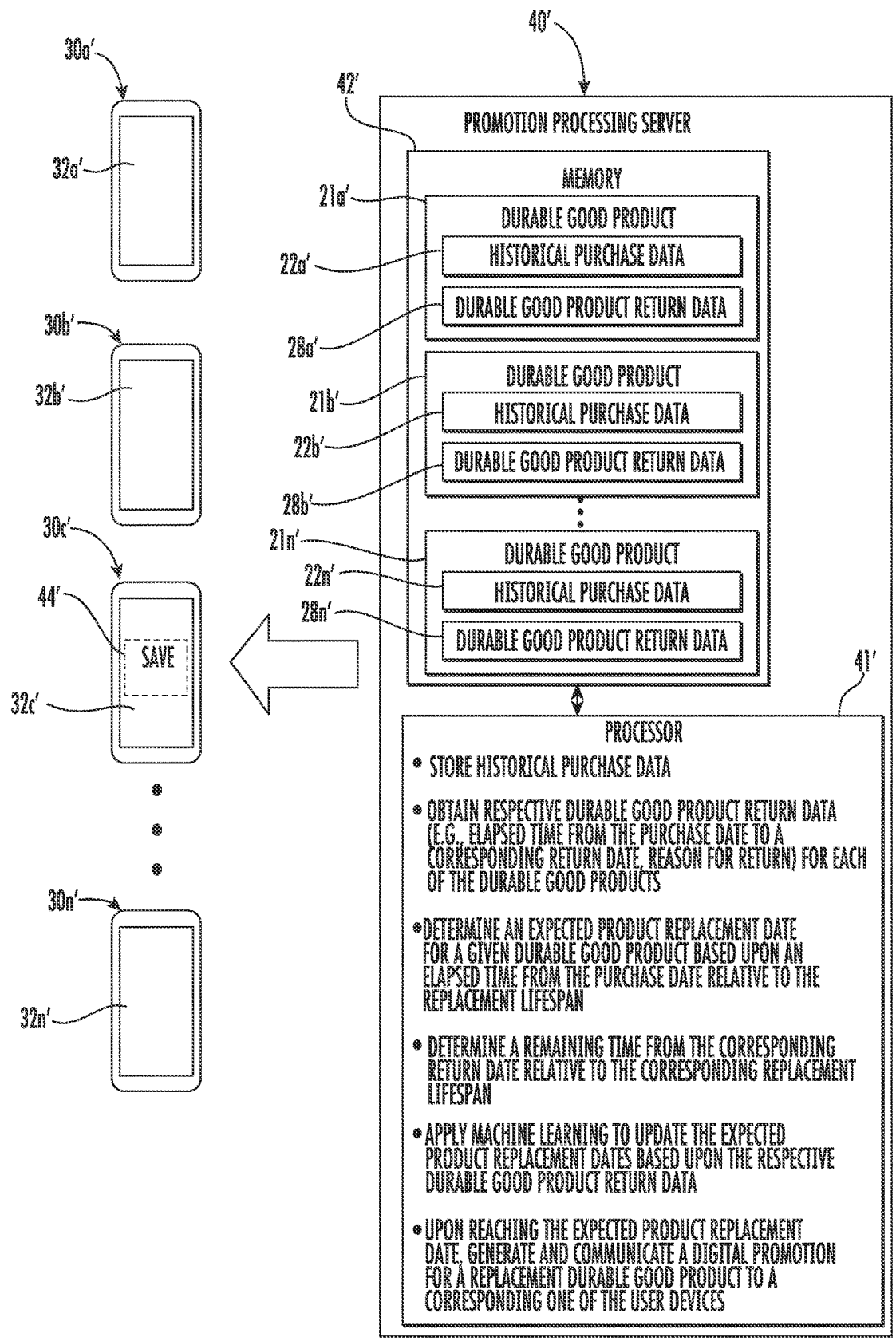
FIG. 6 is a schematic block diagram of a portion of the digital promotion processing system of FIG. 5.
Figure 7:
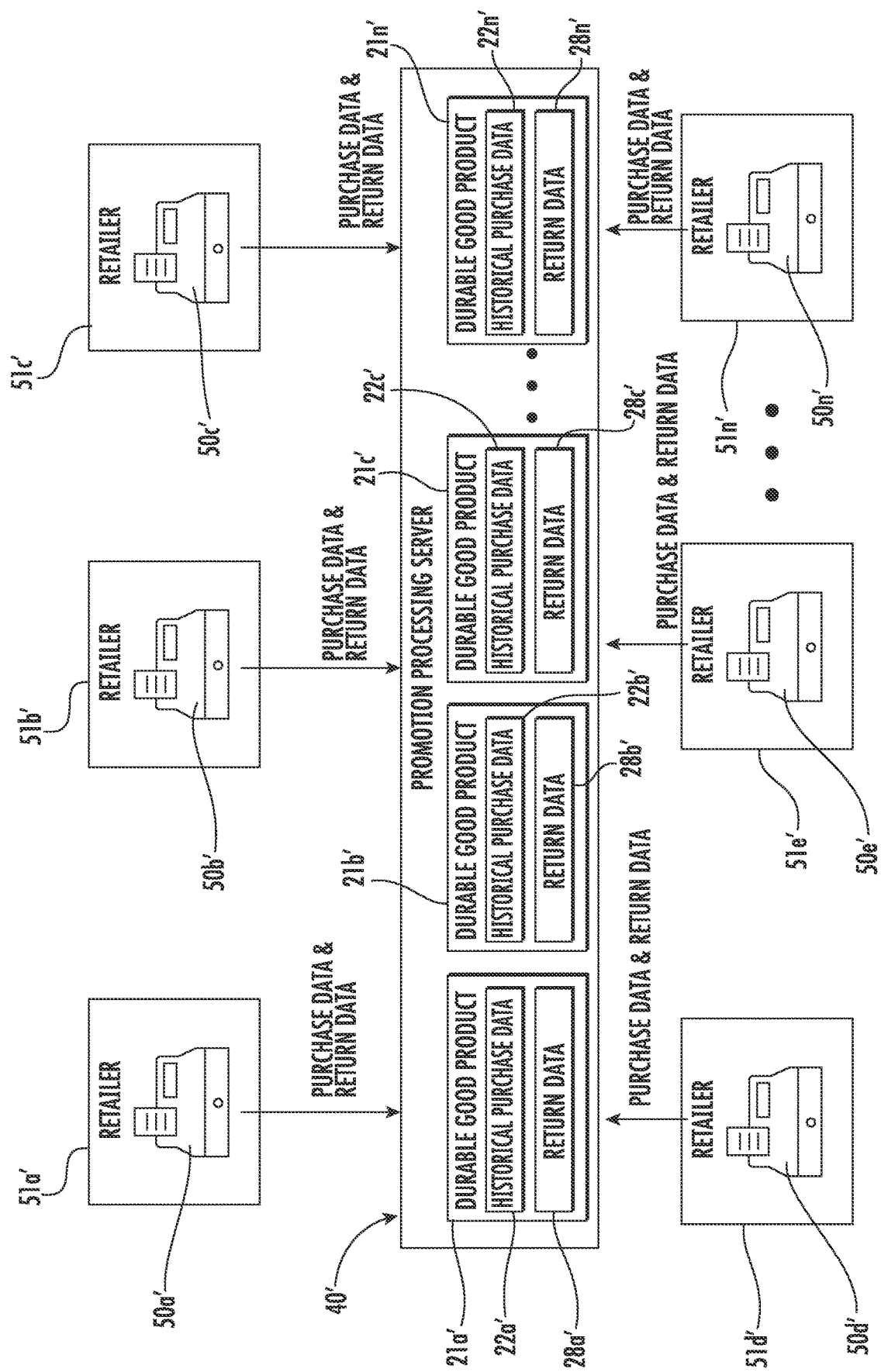
FIG. 7 is a schematic block diagram of a portion of the digital promotion processing system of FIG. 5.
Figure 8:
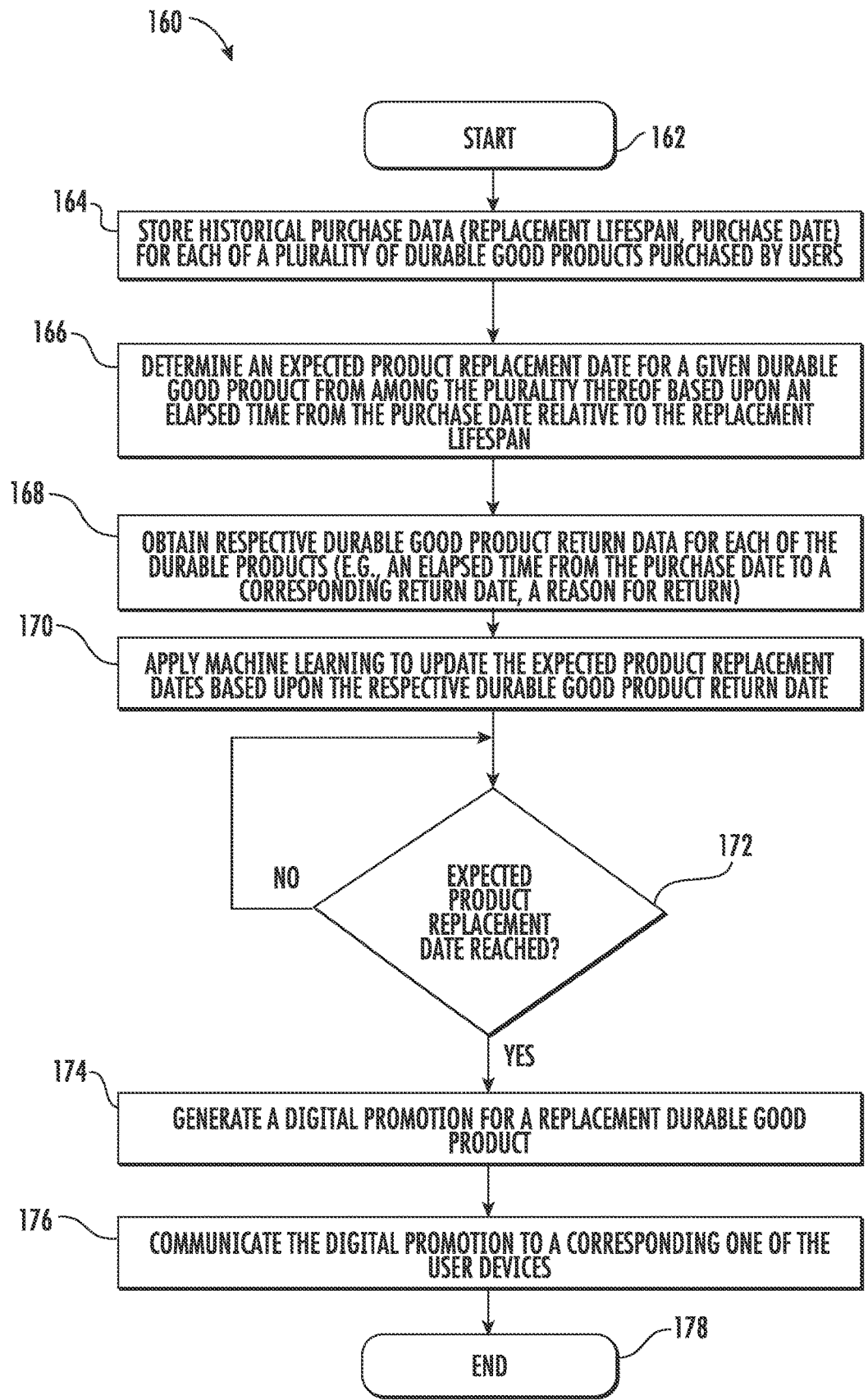
FIG. 8 is a flow chart illustrating operation of the promotion processing server in accordance with an embodiment.

Referring now to FIGS. 5-7, and the flowchart 160 in FIG. 8, beginning at Block 162 further details of operation of the promotion processing server 40' will now be described, specifically with respect to the expected product replacement date 26a'. At Block 164, historical purchase data 22a'-22n' is stored as described above.

At Block 166, the promotion processing server 40' determines an initial expected replacement date 26a' for a given durable good product 21a' based upon an elapsed time from the purchase date 24a' relative to the replacement lifespan 23a'. The initial expected replacement date 26a' for the given durable good product 21a' is determined as described above.

The promotion processing server 40', at Block 168, obtains respective durable good product return data 28a'-28n' for each of the durable good products 21a'-21n'. The durable good product return data 28a'-28n' may be obtained from the POS terminals 50a'-50n' at the different retailers 51a'-51n' and saved with the historical purchase data 22a'-22n'. In other words, based upon the historical purchase data 22a'-22n' and durable good product return data 28a'-28n', the promotion processing server 40' may determine when any given user purchased a durable good product 21a'-21n' (e.g., from any retailer 51a'-51n' in communication with the promotion processing server via the POS terminals 50a'-50n'), the amount paid for the durable good product, whether the durable good product was returned, and when the durable good product was returned (i.e., an elapsed time from the purchase date 24a' to a corresponding return date). In some embodiments, the durable good product return data 28a'-28n' may include a reason for return for each of durable good products 21a'-21n'.

As noted above, user data, which may be included with the historical purchase data 22a'-22n' may also be obtained and stored on an ongoing basis and used by the promotion processing server 40' to update the expected replacement dates, for example, to determine an updated expected product replacement date 27a' for the given durable good product 21a' (Block 170). The promotion processing server 40' may obtain the user data based upon user identifiers or loyalty identifiers at different retailers 51a'-51n' at which each given user shops or has made a purchase.

The promotion processing server 40' applies machine learning to update the expected replacement dates based upon the respective durable good product return data 28a'-28n' and optionally user data. More particularly, the promotion processing server 40' accepts as input, on an ongoing basis, data stored as historical purchase data 22a'-22n', and durable good product return data 28a'-28n'. In some embodiments, historical purchase data 22a'-22n' and return data 28a'-28n' may be obtained and stored for non-durable good products for the users.

In a given implementation example with respect to a given user and a given durable good product 21a' (e.g., a "Brand-W" washing machine), the promotion processing server 40' may determine that a given user may frequently return durable good products. This may be indicative that the given user has a relatively lower threshold when it comes to returning durable good products. Thus, the expected product replacement date 26a' may be updated to be made earlier or less of an elapsed time from the purchase date 24a'.

In embodiments, where historical purchase data 22a'-22n' for non-durable good products and non-durable good product return data is obtained, the promotion processing server 40' may determine that the given user may frequently return non-durable good products. This may be indicative that the given user has a relatively lower threshold when it comes to returning non-durable good products. Thus, the initial expected product replacement date 26a' may be updated to be made earlier or less of an elapsed time from the purchase date. Differences in product return frequencies between durable and non-durable may be used to update the expected product replacement date 26a', for example, if a given user frequently returns non-durable good products, but not durable good products 21a'-21n', the expected product replacement date may be updated to be closer to the replacement lifespan 23a'. If, however, other users with a similar return pattern of non-durable and durable good products 21a'-21n' generally return, for example, washing machines, the promotion processing server 40' may update the expected product replacement date 26a' to be earlier or closer to the purchase date 24a' for the given durable good product 21a'.

Moreover, with respect to the same implementation example, the promotion processing server 40' may also determine whether the users as a whole return the washing machine earlier than the initial expected product replacement date 26a' (i.e., a remaining time from the corresponding return date relative to the corresponding replacement lifespan 23a', for example, which may be indicative of mechanical failure at a time near the corresponding return date, and update the expected product replacement date to be earlier or less of an elapsed time from the purchase date 24a'. Where a return reason is obtained by the promotion processing server 40', the expected product return replacement date 26a' may be updated earlier for mechanical failure, or not updated for when the reason provided is that the given user "did not like" the washing machine.

Where the user did not like the washing machine, a product purchase history (e.g., across all available products including non-durable) and product return history (e.g., across all available products) may be used to build a profile for the given user and update the expected product replacement date 26a' based thereon. For example, the given user typically purchases new or replacement products more frequently than other users, and thus the promotion processing server 40' may update the expected product replacement date to be earlier.

How pricing affects the given user may also be learned and used to update the expected product replacement date 26a'. For example, the given user may frequently purchase new or replacement products having a lower price compared to products having a higher price, such as certain durable good products 21a'-21n' like a washing machine. Thus, the promotion processing server 40' may update the expected replacement date 26a' for the washing machine based upon the replacement cost relative to the learned given user's threshold cost for replacement of other products and within the corresponding time period.

While the above implementation example describes factors of the machine learning that generally update the expected replacement date to be earlier, the same factors or inputs to the machine learning may extend the expected product replacement date. For example, if the given user does not typically return products (durable goods, non-durable goods, all goods) or return products infrequently, and does not purchase replacement products, the expected product replacement date may be extended for the given user. Of course, other and/or additional factors may be considered or used in the machine learning to update the expected replacement date.

At Block 172, the promotion processing server 40' determines whether the expected product replacement date 26a' has been reached, and when so, the promotion processing server generates a digital promotion 44' for a replacement durable good product (Block 174). At Block 176, the promotion processing server 40' communicates the digital promotion 44' for the replacement durable good product to the corresponding user device 30c' from among the user devices 30e-30n'. When the expected product replacement date 26a' has not been reached, operations continue, for example, by polling or waiting for the expected product replacement date to be reached (Block 172).

Of course, in some embodiments, the expected product replacement date 26a' may be updated, for example, based upon the stored and/or additional purchase data, and/or updated durable good product return data 28a'-28n' prior to determining whether the expected product replacement date has been reached. In other words, the expected product replacement date 26a' may change during polling.

The digital promotion 44' may be redeemable as described above, for example, toward another durable good product 21a'-21n', which may be the same brand or a different brand. The promotion processing server 40' may determine a given user's brand preference, for example, based upon the machine learning described above, and generate the digital promotion 44' to be redeemable toward the preferred brand. Operations end at Block 178.

Figure 9A:
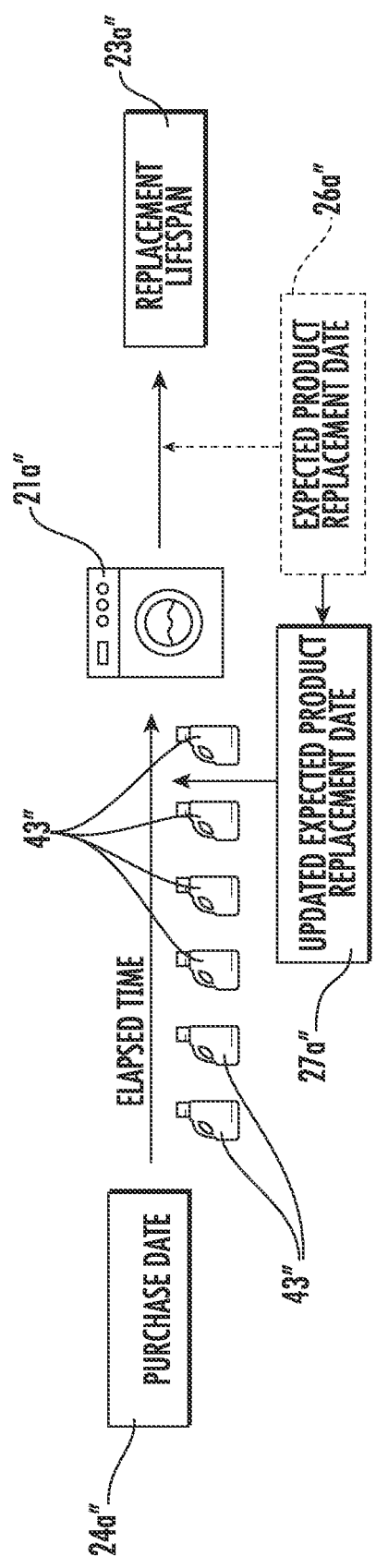
FIG. 9a is a schematic diagram of a portion of a digital promotion processing system in accordance with another embodiment.
Figure 9B:
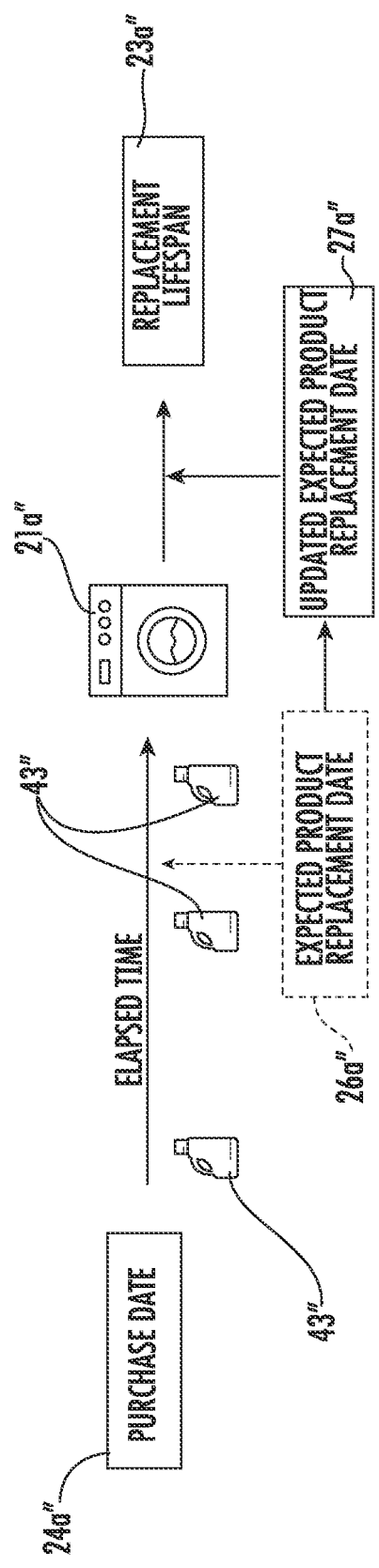
Figure 10:
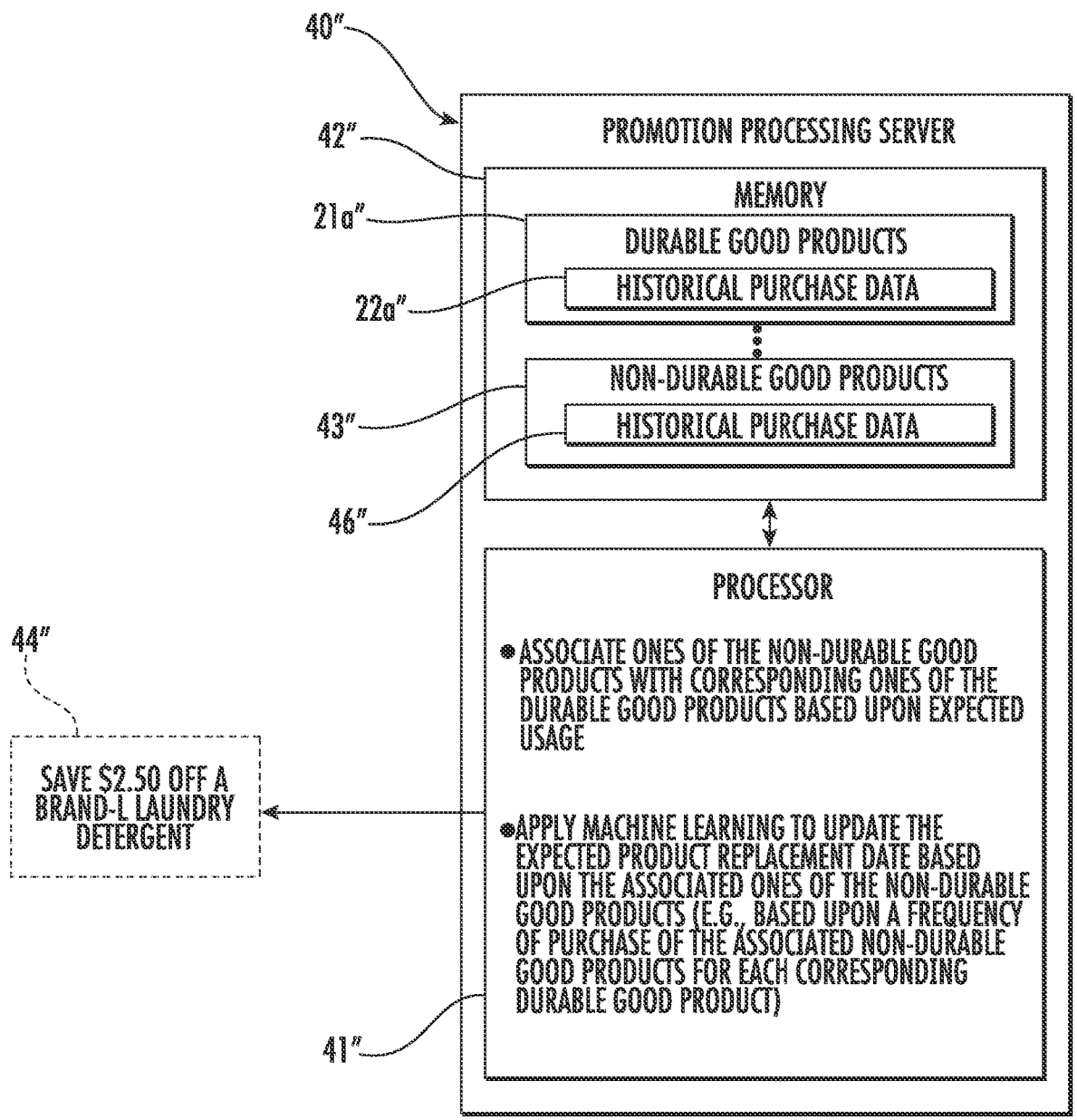
FIG. 10 is a schematic block diagram of the digital promotion processing system of FIGS. 9a and 9b.

Referring now to FIGS. 9-10, in another embodiment, in addition to historical purchase data 22a"-22n" for durable good products 21a"-21n", the promotion processing server 40" also stores historical purchase data 46" for non-durable good products 43" purchased by the users. The promotion processing server 40" associates certain non-durable good products 43" with corresponding durable good products 21a" based upon expected usage. For example, with respect to the above implementation example of a washing machine 21a", the promotion processing server 40" may identify laundry detergent 43" (a non-durable good product or consumable product) as corresponding to the washing machine.

The promotion processing server 40" may learn via machine learning or determine that users with a "Brand-W" washing machine typically purchase 120-ounces of laundry detergent in a given month. Thus, if a given user purchases 200-ounces of laundry detergent in a given month (FIG. 9a), the promotion processing server 40" may update the expected product replacement date 27a" from the initial expected product replacement date 26a" to be closer to the purchase date 24a", as increased laundry detergent usage may be indicative that the washing machine is mechanically failing or not operating efficiently by adequately cleaning clothing such that the given user must wash clothes more often. The replacement purchase habits of other users that have also experienced an increase in laundry detergent usage may be used or learned by the promotion processing server 40" and used as a basis to update the expected product replacement date 27a" for the given user.

In contrast, if a given user purchases 100-ounces of laundry detergent in a given month (FIG. 9b), the promotion processing server 40" may update the expected product replacement date 27a" from the initial expected product replacement date 26a" to be closer to the replacement lifespan date 23a", as decreased laundry detergent usage (or usage less than typical for the corresponding durable good product 21a") may be indicative that the washing machine may outlast or function as intended for an elapsed time beyond the initial expected product replacement date 26a".

In some embodiments, the promotion processing server 40" may account for increased usage based upon a household size. For example, the promotion processing server 40" may determine that normal usage for a "Brand-W" washing machine for a family of six is 200-ounces a month, and thus, the promotion processing server may not update the expected product replacement date 26a". The family size of six may be determined by the promotion processing server 40" using learned patterns from historical purchase data 22a" across stores and including non-durable good products 43". If a given user typically purchases more food, for example, relative to others, the promotion processing server 40" may determine that the food purchases (amount and frequency) correspond to a family of six. As will be appreciated by those skilled in the art, if the usage is less than average, the promotion processing server 40" may update the expected product replacement date to be closer to the replacement lifespan 23a".

The promotion processing server 40" may thus generate and communicate a digital promotion 44" for the associated or companion non-durable good product 43". In embodiments where the digital promotion 44" is redeemable toward the associated or companion non-durable good product, the promotion processing server 40" may track redemption of the digital promotions at the POS terminals and update the expected product replacement date 27a" based upon redemption of the digital promotions.

Moreover, the promotion processing server 40" may update the expected replacement date 27a" based upon expected usage of different types of associated products. For example, with respect to the washing machine implementation example described above, in addition to the learning purchase patterns of detergent, for example, the existence and/or frequency of other products for use with a washing machine (e.g., fabric softener, bleach, washing machine cleaning tabs) may also be obtained for learning to update the expected product replacement date.

A method aspect is directed to a method of processing a digital promotion 44. The method includes using a promotion processing server 40 to store historical purchase data 22a-22n for each of a plurality of durable good products 21a-21n purchased by a plurality of users. The historical purchase data 22a-22n includes a replacement lifespan 23a and a purchase date 24a. The method also includes using the promotion processing server 40 to determine an expected product replacement date 26a for a given durable good product 21a from among the plurality thereof based upon an elapsed time from the purchase date 24a relative to the replacement lifespan 23a, and upon reaching the expected product replacement date, generate and communicate the digital promotion 44 for a replacement durable good product to a corresponding one of a plurality of user devices 30a-30n each associated with a respective different user from among the plurality thereof.

A computer readable medium aspect is directed to a non-transitory computer readable medium for processing a digital promotion 44. The non-transitory computer readable medium includes computer executable instructions that when executed by a processor 41 cause the processor to perform operations. The operations include storing in a memory 42 associated with the processor historical purchase data 22a-22n for each of a plurality of durable good products 21a-21n purchased by a plurality of users. The historical purchase data 22a-22n includes a replacement lifespan 23a and a purchase date 24a. The operations also include determining an expected product replacement date 26a for a given durable good product 21a from among the plurality thereof based upon an elapsed time from the purchase date 24a relative to the replacement lifespan 23a, and upon reaching the expected product replacement date, generating and communicating the digital promotion 44 for a replacement durable good product to a corresponding one of a plurality of user devices 30a-30n each associated with a respective different user from among the plurality thereof.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital promotion processing system comprising:
   a plurality of point-of-sale (POS) terminals each associated with a given retailer,
   a plurality of user devices each associated with a respective different user having a user identifier associated therewith; and
   a promotion processing server configured to, on an on-going basis,
     cooperate with the plurality of POS terminals to obtain historical purchase data for each of a plurality of durable good products purchased by the plurality of users, the historical purchase data comprising a replacement lifespan and a purchase date,
     cooperate with the plurality of POS terminals to obtain historical purchase data for each of a plurality of non-durable good products purchased by the plurality of users, each of the plurality of non-durable good products having a product identifier associated therewith,
     match ones of the non-durable good products with corresponding ones of the plurality of durable good products based upon expected usage of the non-durable good products with the durable good products by identifying the associated product identifiers for the ones of the plurality of non-durable good products that are expected to be used with the corresponding ones of the plurality of durable products,
     cooperate with the plurality of POS terminals to obtain respective durable good product return data for each of the plurality of durable good products,
     determine an expected product replacement date for a given durable good product from among the plurality thereof based upon an elapsed time from the purchase date relative to the replacement lifespan,
     apply machine learning to update the expected replacement date based upon the matched ones of the non-durable good products, and the respective durable good product return data, and
     for a given user
       determine the historical purchase data for each of the non-durable good products purchased by the given user based upon the corresponding user identifier,
       match ones of the non-durable good products purchased by the given user with a given durable good product associated with the given user based upon expected usage of the non-durable good products with the durable good products,
       apply machine learning to learn a predicted frequency of usage for the given durable good product based upon the determined historical purchase data for each of the matched non-durable good products purchased by the given user,
       determine a purchase frequency for each of the plurality of non-durable good products purchased by the given user relative to others of the plurality of users,
       use machine learning to update the expected replacement date based upon the learned predicted frequency of usage and the determined purchase frequency relative to the other users, and
       upon reaching the expected product replacement date, generate and communicate a digital promotion for a replacement durable good product to a corresponding one of the plurality of user devices for the given user.

2. The digital promotion processing system of claim 1 wherein the durable good product return data comprises an elapsed time from the purchase date to a corresponding return date.

3. The digital promotion processing system of claim 2 wherein the promotion processing server is configured to determine a remaining time from the corresponding return date relative to the corresponding replacement lifespan.

4. The digital promotion processing system of claim 1 wherein the durable good product return data comprises a reason for return for each of the plurality of durable good products.

5. The digital promotion processing system of claim 1 wherein the promotion processing server is configured to update the expected product replacement date based upon a frequency of purchase of the matched non-durable good products for each corresponding durable good product.

6. The digital promotion processing system of claim 1 wherein the digital promotion is redeemable toward a non-durable good product used with the given durable good product.

7. The digital promotion processing system of claim 1 wherein the given durable good product has a product category associated therewith; and wherein the digital promotion is redeemable toward another product of a same product category.

8. The digital promotion processing system of claim 1 wherein the given durable good product has a durable good product brand associated therewith; and wherein the digital promotion is redeemable toward another durable good product of a different durable good product brand.

9. A promotion processing server comprising:
a processor and an associated memory configured to, on an on-going basis,
cooperate with a plurality of point-of-sale (POS) terminals each associated with a given retailer to obtain historical purchase data for each of a plurality of durable good products purchased by a plurality of users each having a user identifier associated therewith, the historical purchase data comprising a replacement lifespan and a purchase date,
cooperate with the plurality of POS terminals to obtain historical purchase data for each of a plurality of non-durable good products purchased by the plurality of users, each of the plurality of non-durable good products having a product identifier associated therewith,
match ones of the non-durable good products with corresponding ones of the plurality of durable good products based upon expected usage of the non-durable good products with the durable good products by identifying the associated product identifiers for the ones of the plurality of non-durable good products that are expected to be used with the corresponding ones of the plurality of durable products,
cooperate with the plurality of POS terminals to obtain respective durable good product return data for each of the plurality of durable good products,
determine an expected product replacement date for a given durable good product from among the plurality thereof based upon an elapsed time from the purchase date relative to the replacement lifespan,
apply machine learning to update the expected replacement date based upon the matched ones of the non-durable good products, and the respective durable good product return data, and
for a given user from among the plurality of users
determine the historical purchase data for each of the non-durable good products purchased by the given user based upon the corresponding user identifier,
match ones of the non-durable good products purchased by the given user with a given durable good product associated with the given user based upon expected usage of the non-durable good products with the durable good products,
apply machine learning to learn a predicted frequency of usage for the given durable good product based upon the determined historical purchase data for each of the matched non-durable good products purchased by the given user,
determine a purchase frequency for each of the plurality of non-durable good products purchased by the given user relative to others of the plurality of users,
use machine learning to update the expected replacement date based upon the learned predicted frequency of usage and the determined purchase frequency relative to the other users, and upon reaching the expected product replacement date, generate and communicate a digital promotion for a replacement durable good product to a corresponding user device associated with the given user.

10. The promotion processing server of claim 9 wherein the durable good product return data comprises an elapsed time from the purchase date to a corresponding return date.

11. The promotion processing server of claim 9 wherein the digital promotion is redeemable toward a non-durable good product used with the given durable good product.

12. A method of processing a digital promotion comprising:
using a promotion processing server to, on an on-going basis,
cooperate with a plurality of point-of-sale (POS) terminals each associated with a given retailer to obtain historical purchase data for each of a plurality of durable good products purchased by a plurality of users each having a user identifier associated therewith, the historical purchase data comprising a replacement lifespan and a purchase date,
cooperate with the plurality of POS terminals to obtain historical purchase data for each of a plurality of non-durable good products purchased by the plurality of users, each of the plurality of non-durable good products having a product identifier associated therewith,
match ones of the non-durable good products with corresponding ones of the plurality of durable good products based upon expected usage of the non-durable good products with the durable good products by identifying the associated product identifiers for the ones of the plurality of non-durable good products that are expected to be used with the corresponding ones of the plurality of durable products,
cooperate with the plurality of POS terminals to obtain respective durable good product return data for each of the plurality of durable good products,
determine an expected product replacement date for a given durable good product from among the plurality thereof based upon an elapsed time from the purchase date relative to the replacement lifespan,
apply machine learning to update the expected replacement date based upon the matched ones of the non-durable good products, and the respective durable good product return data, and
for a given user
determine the historical purchase data for each of the non-durable good products purchased by the given user based upon the corresponding user identifier,
match ones of the non-durable good products purchased by the given user with a given durable good product associated with the given user based upon expected usage of the non-durable good products with the durable good products,
apply machine learning to learn a predicted frequency of usage for the given durable good product based upon the determined historical purchase data for each of the matched non-durable good products purchased by the given user,
determine a purchase frequency for each of the plurality of non-durable good products purchased by the given user relative to others of the plurality of users, use machine learning to update the expected replacement date based upon the learned predicted frequency of usage and the determined purchase frequency relative to the other users, and upon reaching the expected product replacement date, generate and communicate the digital promotion for a replacement durable good product to a corresponding user device associated with the given user.

13. The method of claim 12 wherein the durable good product return data comprises an elapsed time from the purchase date to a corresponding return date.

14. A non-transitory computer readable medium for processing a digital promotion, the non-transitory computer readable medium comprising computer executable instructions that when executed by a processor cause the processor to perform operations, on an on-going basis, comprising:

cooperating with a plurality of point-of-sale (POS) terminals each associated with a given retailer to obtain historical purchase data for each of a plurality of durable good products purchased by a plurality of users each having a user identifier associated therewith, the historical purchase data comprising a replacement lifespan and a purchase date;

cooperating with the plurality of POS terminals to obtain historical purchase data for each of a plurality of non-durable good products purchased by the plurality of users, each of the plurality of non-durable good products having a product identifier associated therewith;

matching ones of the non-durable good products with corresponding ones of the plurality of durable good products based upon expected usage of the non-durable good products with the durable good products by identifying the associated product identifiers for the ones of the plurality of non-durable good products that are expected to be used with the corresponding ones of the plurality of durable products, cooperating with the plurality of POS terminals to obtain respective durable good product return data for each of the plurality of durable good products;

determining an expected product replacement date for a given durable good product from among the plurality thereof based upon an elapsed time from the purchase date relative to the replacement lifespan;

applying machine learning to update the expected replacement date based upon the matched ones of the non-durable good products, and the respective durable good product return data;

for a given user from among the plurality thereof determining the historical purchase data for each of the non-durable good products purchased by the given user based upon the corresponding user identifier, matching ones of the non-durable good products purchased by the given user with a given durable good product associated with the given user based upon expected usage of the non-durable good products with the durable good products, applying machine learning to learn a predicted frequency of usage for the given durable good product based upon the determined historical purchase data for each of the matched non-durable good products purchased by the given user, determining a purchase frequency for each of the plurality of non-durable good products purchased by the given user relative to others of the plurality of users, using machine learning to update the expected replacement date based upon the learned predicted frequency of usage and the determined purchase frequency relative to the other users, and upon reaching the expected product replacement date, generating and communicating the digital promotion for a replacement durable good product to a corresponding user device associated with the given user.

15. The non-transitory computer readable medium of claim 14 wherein the durable good product return data comprises an elapsed time from the purchase date to a corresponding return date.

* * * * *